United States Patent [19]

Alashqur

[11] Patent Number: 5,504,885
[45] Date of Patent: Apr. 2, 1996

[54] O-R GATEWAY: A SYSTEM FOR CONNECTING OBJECT-ORIENTED APPLICATION PROGRAMS AND RELATIONAL DATABASES

[75] Inventor: Abdallah M. Alashqur, Dallas, Tex.

[73] Assignee: Texas Instruments Incorporated, Dallas, Tex.

[21] Appl. No.: 84,841

[22] Filed: Jun. 29, 1993

[51] Int. Cl.$^6$ .................................................. G06F 17/30
[52] U.S. Cl. .................... 395/600; 395/700; 364/DIG. 1; 364/280.4; 364/283.4
[58] Field of Search ..................................... 395/600, 700

[56] References Cited

U.S. PATENT DOCUMENTS

| | | | |
|---|---|---|---|
| 5,129,086 | 7/1992 | Coyle, Jr. et al. | 395/650 |
| 5,212,787 | 5/1993 | Baker et al. | 395/600 |
| 5,230,049 | 7/1993 | Chang et al. | 395/700 |
| 5,257,366 | 10/1993 | Adair et al. | 395/600 |
| 5,291,583 | 3/1994 | Bapat | 395/500 |
| 5,297,279 | 3/1994 | Bannon et al. | 395/600 |

OTHER PUBLICATIONS

Navathe, S. B., et al.; *Abstracting Relational and Hierarchical Data With a Semantic Data Model;* Nov. 9–11, 1987; Proc. of 6th Int'l Conf. on Entity–Relationship Approach, NY, Sal March (ed.).

Wiederhold, G., et al.; *The Structural Model for Database Design;* 1980; pp. 247–267; Proc. of Int'l Conf. on Entity–Relationship Approach to Systems Analysis and Design; North Holland.

Barsalou, T., et al.; *Complex Objects for Relational Databases;* Computer–Aided Design; Oct. 1990, vol. 22, No1. 8; pp. 458–468.

Premeriani, W. J., et al.; *An Object–Oriented Relational Database;* Communications of the ACM; Nov. 1990, vol. 33, No. 11; pp. 99–109.

Blaha, M. R., et al.; *Relational Database Design Using an Object–Oriented Methodology;* Communications of the ACM; Apr. 1988, vol. 31, No. 4, pp. 414–427.

Rumbaugh, J.; *Relations as Semantic Constructs in an Object–Oriented Language;* OOPSLA '87 Proc., Oct. 4–8, 1987; pp. 466–481.

Barsalou, T., et al.; *Upstanding Relational Databases Through Object–Based Views;* ACM, 1991, Feb. 1991, pp. 248–257. (ACM 0–89791–425–2/91/0005/0248).

*Primary Examiner*—Thomas G. Black
*Assistant Examiner*—John C. Loomis
*Attorney, Agent, or Firm*—Tammy L. Williams; Leo N. Heiting; Richard L. Donaldson

[57] ABSTRACT

This is a method and system of extending the capability of a relational database management system's precompiler to object-oriented languages comprising: embedding SQL statement in an object-oriented program; compiling the object-oriented program with a precompiler from the database management system into a temporary file; compiling the temporary file with an object-oriented precompiler into a file acceptable to an object-oriented compiler; and compiling the file with the object-oriented compiler into an executable file.

14 Claims, 3 Drawing Sheets

O-R GATEWAY: A SYSTEM FOR CONNECTING OBJECT-ORIENTED APPLICATION PROGRAMS AND RELATIONAL DATABASES

FIELD OF THE INVENTION

This invention relates to the field of object-oriented technology, more particularly, the field of object-oriented programming with relational databases.

BACKGROUND OF THE INVENTION

Many application developers are adopting the use of object-oriented programming languages and design techniques to develop software applications because of the advantages these languages offer over conventional programming languages. For example, object-oriented languages support the definition of complex objects, inheritance hierarchies, and behavioral properties of objects. For these same reasons, object-oriented representation is also considered more powerful than the relational data model used to define relational databases. However, many enterprises have their data stored in databases managed under relational database management systems, and object-oriented application programs often need to access this data to facilitate further processing.

Many new software applications have been, and are being, developed using object-oriented programming languages and techniques. Applications in areas such as office information systems, CAD/CAM, CASE, and geographic information systems have requirements that can not be easily satisfied by traditional programming languages and design techniques. The type systems of object-oriented programming languages encompass constructs that can be used to define complex objects, inheritance hierarchies, and behavioral properties of objects. An object state can be encapsulated, which enables updating the implementation of object classes without breaking application programs. These characteristics of object-oriented programming languages make them more adequate for handling advanced as well as traditional application domains than conventional programming languages.

Applications written in object-oriented programming languages need to interact with relational databases (RDBs) for several reasons.

A first reason is the existence of legacy data. Many enterprises have their data stored in relational databases (RDBs). This data is a necessary input to many decision making processes. Application programs written in object-oriented programming languages need to access this data in order to facilitate further processing.

A second reason is persistence. Application programmers often need to make some of the objects created in application programs persist between program invocations. The unavailability of wide-spread robust, scalable, and industrial strength object-oriented DBMSs make relational DBMSs a viable candidate for maintaining persistent data generated by object-oriented application programs. Relational DBMSs are favored over file systems, another candidate for storing persistent data, because they offer many useful functions such as concurrency control, recovery, physical data independence, and associative query capabilities.

A third reason is migration of legacy data to object-oriented DBMSs. Once standard commercial object-oriented DBMSs become available, many enterprises may want to migrate their legacy relational data to object-oriented databases managed by these object-oriented DBMSs. Application programs can be written to facilitate this process. These programs will need to access existing RDBs, retrieve data, construct objects by reformatting and assembling retrieved data, and then store these objects in an object-oriented DBMS. This will automate the process of reverse engineering the data.

The structural data model, which defines classes and connections between classes was introduced in "The Structural Model for Database Design," Proceedings of the International Conference on Entity-Relationship Approach to Systems Analysis and Design, 1980 by G. Wiederhold and R. Elmasri. In this model, classes are relations (i.e., tables as defined in a relational database). Connections that can exist between relations are of three types. The definition of these three connection types was introduced in the Wiederhold et al. article and further refined in the Barsalou et al. (91) article. In the detailed description of the preferred embodiments, we give the definition of these connection types and further extend them by modifying the definition of some types and defining new types. The resulting set of connection types is used in O-R Gateway to guide the mapping from relational schemas to schemas defined in the C++ type system.

The view-object model and its implementation in a system called PENGUIN was introduced in "Complex Objects for Relational Databases," Computer-Aided Design, October, 1990 by T. Barsalou and G. Wiederhold, and Barsalou et al. (91). PENGUIN allows for defining objects on top of a relational database. These objects are similar to relational database views but with object attributes rearranged to remove redundancy and reflect the nesting of constituent objects within more complex objects. In other words, instances of a view object are represented in a non-normal form. The structural model described above is at the core of PENGUIN.

PENGUIN operates as follows. A schema of the relational database is presented to the user in a graphical form based on the constructs of the structural data model, i.e., relations as nodes and connections of different types as links between relations. Three different graphical symbols are used to distinguish the three connection types. The user can choose one of the relations (nodes in the graph) as a "pivot" relation. PENGUIN then derives a candidate tree of relations and connections that is rooted at the pivot relation. Following that, the user identifies a subset of the tree by selecting nodes that need to be included in the view object (the pivot relation will be automatically included and need not be explicitly selected). The resulting subtree represents a view object, which is given a name by the user. Next, PENGUIN generates a data access function that can be expressed as a SQL query. The data access function includes the necessary join predicates to retrieve data pertaining to the view object. A user can issue a predicate-based query against a view object to identify the set of instances of interest. PENGUIN combines the user's query with the data access function of the view object to produce a query that retrieves only the needed tuples from the relational database. Penguin assembles the set of resulting tuples to build instances of the view object and represent them in a hierarchical fashion.

In "Abstracting Relational and Hierarchical Data With a Semantic Data Model," Proceedings of the 6th International Conference on Entity-Relationship Approach, New York, Sal March (ed.), 1987 by S. B. Navathe and A. M. Awong, the authors describe a process of 10 steps for mapping relations, attributes and relational constraints into entities, weak entities, categories, relationships, and attributes expressed in the Entity-Category-Relationship (ECR) data model. In O-R Gateway, we chose not to make use of the approach of Navathe et al. because the structural data model is simpler than the ECR model, and some ECR constructs, such as relationships and categories, have no direct counterparts in the C++ type system.

SUMMARY OF THE INVENTION

The two main problems facing object-oriented application programmers when accessing relational data directly are (1) they have to learn and handle two heterogeneous representation schemes in their programs, and (2) they do not get the full benefit of the object-oriented representation. To alleviate these problems, we need an approach and a system to bridge the gap between relational databases and object-oriented application programs by translating the relational definitions of data to equivalent object-oriented definitions and enabling application developers to query relational data through these object-oriented definitions. In this work, we describe an approach for achieving this and introduce the design of O-R Gateway, a system that enables object-oriented application programs to handle relational data as if they were object-oriented objects.

The present invention describes the design and implementation of the O-R Gateway, for connecting object-oriented application programs written in object-oriented languages with relational databases. The preferred embodiment describes the O-R Gateway implemented with the C++ object-oriented language and the Oracle relational DBMS. We have chosen C++ and Oracle because of their popularity, nevertheless, the ideas and techniques presented in this report can be applied to build interfaces between other object-oriented programming languages and relational DBMSs. The O-R Gateway itself is being developed in C++.

An objective is to be able to access data stored in autonomous, heterogeneous, and possibly distributed DBMSs and file systems from object-oriented application programs. By achieving this, the type system of object-oriented acts as a framework (global data model) for integrating these systems. O-R Gateway, which allows for accessing relational data, is a step in this direction. O-R Gateway enables object-oriented programmers to see an object-oriented view (objects, classes, inheritance relationships, etc.) of data stored in legacy relational databases. This is done by translating a relational schema to equivalent object-oriented class definitions based on some translation rules to be discussed in this report. These class definitions are stored in header files that can be included in object-oriented application programs. The generated header files can be edited by application programmers to add behavioral semantics (methods or member functions). O-R Gateway also translates set-oriented object queries embedded in object-oriented application programs and issued against object-oriented classes to SQL queries against the relational representation. This is performed by preprocessing the application programs before compiling them. Query results are transformed from the relational form to object-oriented objects by O-R Gateway and presented to the programmer as such. O-R Gateway shields application programmers from the underlying relational system.

These capabilities of O-R Gateway enable an application program to access legacy relational data. O-R Gateway can be extended to enable application programs, in addition to accessing legacy data, to create their own object types and objects and make them persist in the RDB. This can be done by implementing a module for mapping the structural components of object-oriented class definitions to equivalent relational definitions and then creating these relations in the underlying RDB. Objects created by the application programs will be decomposed and mapped to tuples and stored in these relations.

This is a method and system of extending the capability of a database management system's precompiler to object-oriented languages comprising: embedding SQL in an object-oriented program; compiling the modified object-oriented program with a precompiler from the database management system into a temporary file; compiling the temporary file with an object-oriented precompiler into a file acceptable to a object-oriented compiler; and compiling the file with the object-oriented compiler into an executable file.

DETAILED DESCRIPTION OF THE PREFERRED EMBODIMENTS

As stated earlier, C++ and Oracle have been chosen as the object-oriented language and database management system, respectively, because of their popularity. Nevertheless, the ideas and techniques presented in this report can be applied to build interfaces between other object-oriented programming languages and relational DBMSs. The O-R Gateway itself has being developed in C++.

Figure 1:
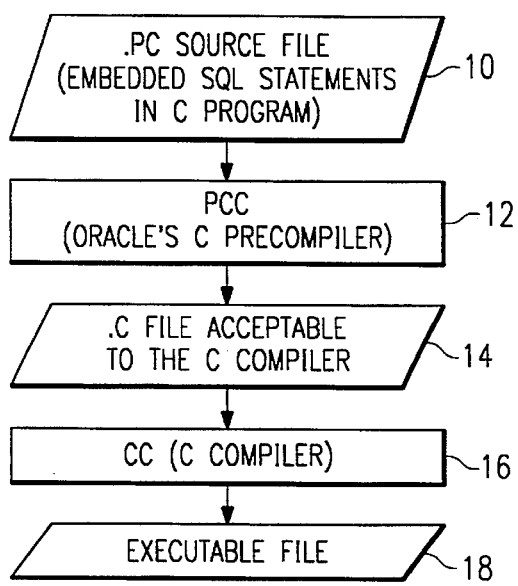
FIG. 1. Processing Embedded SQL in C by the Oracle Precompiler.

FIG. 1 illustrates how the Oracle C Precompiler (pcc) 12 works. It accepts source files 10 containing SQL statements embedded in C programs. Then the pcc (Oracle's C precompiler) 12 translates the SQL statements into Oracle calls (within the .c file 14) recognizable by the C compiler. The cc (C compiler) 16 then compiles the .c file 14 into an executable file 18.

To enable embedding SQL statements in C++ (SQL/C++) we have developed a processor called pcc+ that makes the output of the Oracle Precompiler acceptable to the C++ translator. Pcc+ was developed using the AWK programming language.

Figure 2:
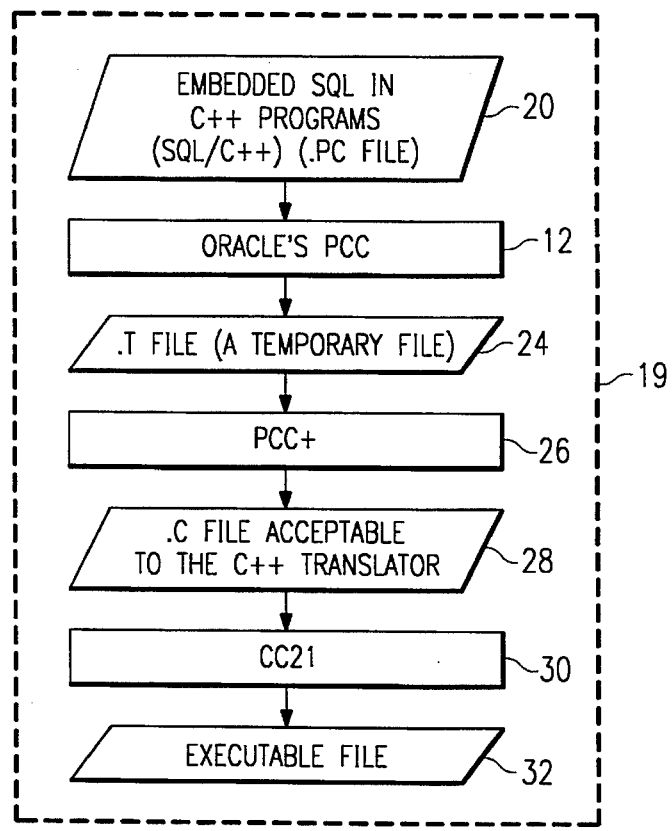
FIG. 2. Extending the Capability of Oracle's Precompiler to handle C++, SQL/C++ Programs.

FIG. 2 shows the data flow in the system when using SQL/C++ and pcc+. The embedded SQL in C++ programs (SQL/C++, pc file) 20 is compiled with Oracle's pcc 12 into a .t file (temporary file) 24. Then the t temporary file 24 is compiled with the pcc+ 26 into a .c file 28 acceptable to the C++ translator 30. Then the C++, translator CC21 30, translates the .c file 28 into an executable file 32. Box 19 represents the entire process described in FIG. 2.

Figure 3:
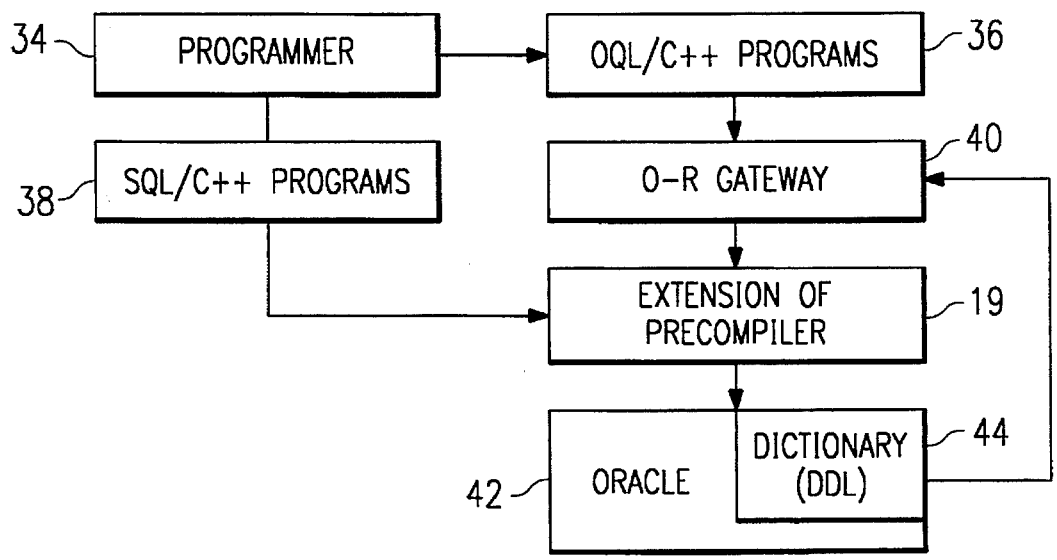
FIG. 3. O-R Gateway Enables Object Queries in C++ Programs.

FIG. 3 shows where the O-R Gateway 40 fits in the overall architecture. The Oracle database 42 and the Dictionary 44 are also shown in relationship to the over-all architecture. Box 19 represents the processes depicted in FIG. 2. A programmer 34 can either write SQL/C++ 38 or OQL/C++ 36 application programs, where OQL is an object query language designed to operate on the constructs of the C++ type system. SQL/C++ programs 38 can be written by those programmers who are familiar with the relational type system (data model) as well as the C++ type system. If needed, an SQL/C++ programmer has to explicitly take care of translating data representations between the two type systems. On the contrary, an OQL/C++ programmer only sees the C++ type system and accesses persistent data via high-level object queries issued against C++ classes. The relational DBMS and data model are transparent to this programmer. O-R Gateway takes care of the schema, query, and object translations between the C++ program and the underlying relational DBMS, therefore, bridging the mismatch between their type systems.

Figure 4:
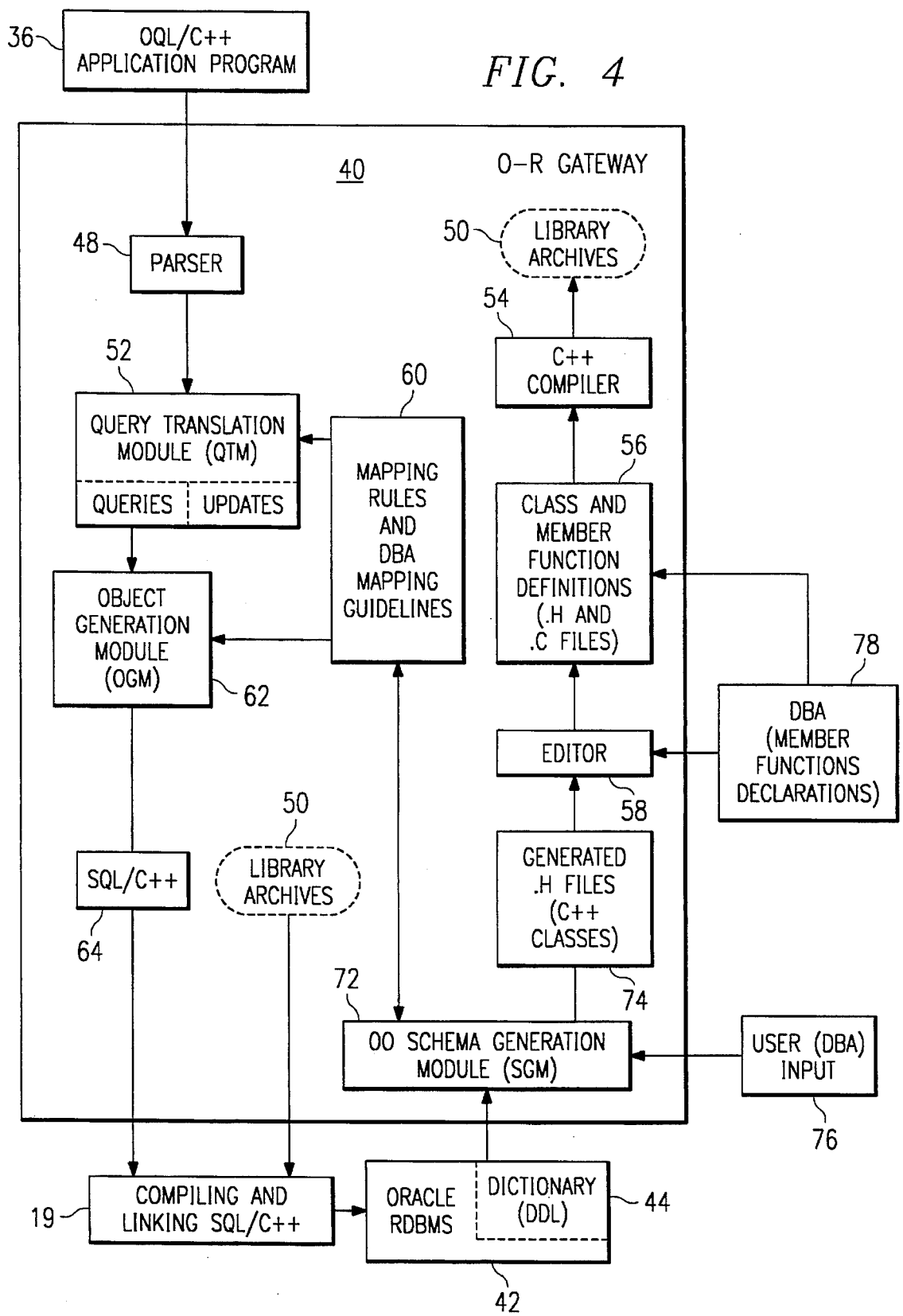
FIG. 4. O-R Gateway Modules.

FIG. 4 illustrates the detailed architecture of the O-R Gateway system. The path that starts at the object-oriented Schema Generation Module (SGM) 72 and ends at the Library Archives 50 translates relational schemas to equivalent C++ schemas with behavioral semantics. The SGM 72 extracts information about the schema of a relational database from the relational dictionary 44. Based on the mapping rules 60 (defined in the detailed description of the preferred embodiment) and user or database administrator (DBA) input 76, the SGM 72 generates header files 74 that include the C++ class definitions to represent the underlying relational data. After the SGM 72, the class definitions only contain a structural component (i.e., data members and type-subtype relationships) but do not include a behavioral component (i.e., member functions). A user (programmer) can edit using editor 58 these header files to add member functions declarations 78 and can add new files including member functions definitions 56. The resulting files can then be compiled by the C++ compiler 54 and stored in Library Archives 50.

The path that starts at the Parser 48 and ends at SQL/C++ 64 takes care of translating object queries in the OQL/C++ application program 36 to SQL queries and generating C++ objects out of retrieved data. Header files 56 generated by the SGM 72 and edited by the user at 78, that correspond to a particular database, need to be included in the OQL/C++ application programs 36 that use the database (for each relational database in the system there will be a set of library archives 50).

The Parser 48 syntactically validates the object query statements and generates internal data structures for representing these statements. The Query Translation Module (QTM) 52 translates parsed object query statements to equivalent SQL statements that are targeted to the underlying relational database and adds the necessary CONNECT statements to connect to the relational DBMS.

The Objects Generation Module (OGM) 62 generates code that constructs C++ objects by assembling relevant data retrieved from the relational database. The mapping rules and DBA guidelines 60 used by the SGM 72 are also used by QTM 52 and OGM 62. The library archives 50 that include the compiled C++ type definitions and member functions 56 are linked with the generated SQL/C++ program 19. The library archives 50 and header files 56 and 74 for a database need to be generated only once, even if more than one OQL/C++ application program 36 need to access the same database. These header files 56 and 74 and library archives 50 can then be included in and linked with those application programs.

We make use of the rules employed in PENGUIN (Barsalou et al. 91) for mapping a relational schema to a schema represented in the structural data model (Wiederhold et al. 80, and Barsalou et al. 91). However, there are major differences between the O-R Gateway system and PENGUIN. The following are some of these differences: (1) we modify the definition of some connection types and define other new connection types in order to be able to address important cases not covered in PENGUIN; (2) we show how an object-oriented schema can be represented using the type system of a specific object-oriented programming language (C++); (3) O-R Gateway allows a user or a DBA to add a behavioral component (operations or methods) to the resulting C++ schema; and (4) PENGUIN provides the application programmer (or end user) with a set of predefined view objects that the user can query. O-R Gateway, on the other hand, presents the application programmer with the entire database schema represented in the C++ type system and the application programmer is free to pose queries against any class.

In the structural data model, a connection exists between two relations R1 and R2 based on two subsets of their attributes A1 of R1 and A2 of R2, if data types of A1 attributes are identical to those of A2 and the cardinality of A1 is equal to the cardinality of A2 (i.e., A1 and A2 are union-compatible). A1 and A2 are referred to as the connection attributes. Two tuples t1 and t2 of R1 and R2, respectively, are connected if the values of A1 attributes in t1 is equal to the values of A2 attributes in t2, i.e., t1[A1] t2[A2], where t[A] denotes the sub-tuple of t that contains the A attribute values.

Three types of connections were identified in Wiederhold et al. 80, and "Updating Relational Databases through Object-Based Views," 1991 ACM SIGMOD Conference on Management of Data Proceedings by T. Barsalou, N. Siambela, A. M. Keller, and G. Wiederhold. In the following, we provide a definition for each of the three types of connections in terms of primary and foreign key constraints on relations. We use PK(R) to denote the set of attributes that constitute a primary key of relation R and FK(R) to denote the set of attributes that constitute a foreign key of R. [Note: the set of foreign key attribute values in a relation must be subset of the set of primary key attribute values in another relation (Jim Melton (editor), ISO/ANS1 Working draft—Database Language SQL2, October 1990)].

Each of the three connection types must satisfy the following rule:

A1=PK(R1)and A2=FK(R2).

In addition to this common rule, a specific rule must be satisfied by each connection type as defined below:

1. An ownership connection from R1 to R2 exists if (A2 is a subset of the set of primary key attributes of A1).

2. A subset connection from R1 to R2 exists if A2=PK(R2).

3. A reference connection from A1 to R1 exists if none of the rules for the other connection types is satisfied.

To demonstrate, we apply the above rules to the following relational schema and constraints:

DEPARTMENT (dname, floor, budget)
EMPLOYEE (ename, dept, project)
HOURLY_EMP (ename, wage, skills)
EMP_CAR (ename, decal_date)

Primary keys are underlined. Foreign key constraints on these relations are: dept in EMPLOYEE is a foreign key matching dname in DEPARTMENT and ename is a foreign key in both HOURLY_EMP and EMP_CAR matching ename in EMPLOYEE. The partial primary key of EMP_CAR, carno, in EMP CAR identifies an employee's cars (i.e., first, second, etc.) and is not unique across all tuples of the relation.

Connections that exist between these relations based on the rules given above are:

1. Ownership connection. Since ename is the primary key of EMPLOYEE and is part (subset) of the primary key of EMP_CAR and given the above foreign key constraints, there is an ownership connection from EMPLOYEE to EMP_CAR. EMP_CAR tuples are owned by EMPLOYEE tuples in the sense that an EMP_CAR tuple cannot exist in the database without being related to an EMPLOYEE tuple. The multiplicity from an owner relation to an owned relation is 1:n; an EMPLOYEE tuple can own several EMP_CAR tuples, while an EMP_CAR tuple must be owned by only one EMPLOYEE tuple.

2. Subset connection. There is a subset connection from EMPLOYEE to HOURLY_EMP based on the connection attribute ename, which is the primary key of both EMPLOYEE and HOURLY_EMP and a foreign key in HOURLY_EMP. This implies that the set of entities that HOURLY_EMP tuples describe is a subset of the set of entities described by the tuples of EMPLOYEE.

3. There is a reference connection from EMPLOYEE to DEPARTMENT based on connection attributes dept and dname, since none of the rules for ownership and subset connections is satisfied. An EMPLOYEE tuple is said to reference a DEPARTMENT tuple. The multiplicity of a reference connection is n:1; an EMPLOYEE tuple can reference only one DEPARTMENT tuple, while a DEPARTMENT tuple can be referenced by several EMPLOYEE tuples.

We extend the definition of some of the connection types described above for the structural data model and define some new connection types. Our goal is to cover cases that may exist in a relational schema that are not covered by the above three connection types. In what follows, we first extend the definition of the ownership connection and then define some new connection types.

In some cases, a foreign key A2 of a relation A1 (matching A1 of R1) is not part of the primary key of that relation, yet, there is an existence dependency of tuples of A1 on tuples of R1 expressed as a NON-NULL constraint on A2. This case becomes clear if we replace carno of EMP_CAR with registrationNo whose values are unique across all tuples. The definition of EMP_CAR becomes:

EMP CAR (registrationNo, ename, decal_date)

where registrationNo is the primary key and ename is a foreign key which is constrained to be NON-NULL. An EMP_CAR tuple can not exist in the database without being related to an EMPLOYEE tuple, and therefore, there is an ownership connection from EMPLOYEE to EMP_CAR. To handle this case, we modify the definition of an ownership connection type to the following:

An ownership connection from R1 to A1 exists if O-R NON-NULL(A2).

Below, we introduce the definition of two new connection types.

4. A set-equality connection exists between R1 and R2 if A2 PK(A1) and A1=FK(R1) and A1=PK(R1) and A2=FK(R2).

The last two predicates in this list of predicates is the common rule that the other three connection types must satisfy (see above). This connection type implies that the set of entities described in R1 must be equal to the set of entities described in A1. A practical example of this case can be illustrated if we define the relation:

EMP_INSU (ename, policy, date)

which adds life insurance information about employees to the above database. To satisfy a requirement that every employee in the company must have life insurance, then ename in EMP_INSU should be modeled as a foreign key attribute matching ename in EMPLOYEE, and ename in EMPLOYEE should also be modeled as a foreign key matching ename in EMP_INSU.

5. A set-intersection connection exists between R1 and A1 if A1=PK(R1) and A2=PK(A1). As a special case, the common rule that is applicable to the above four connection types, does not apply to this connection type.

A set-intersection connection between two relations implies that the two sets of entities described in the two relations do not have to be equal and their intersection may or may not be NULL.

A procedure for generating a C++ schema out of a relational schema is discussed next. We use the following relational schema to illustrate this procedure, assuming that the foreign key and NON-NULL constraints described above are applicable.

```
DEPARTMENT (dname, floor, budget)
EMPLOYEE (ename, dept, project)
HOURLY_EMP (ename, wage, skills)
EMP_CAR (registrationNo, ename, decal_date)
```

The generated C++ schema is as follows:

```
/* define a parameterized set class */
template <class type>
class set {
/* . . data members and member functions definitions . . */
}
class C_DEPARTMENT {
private:
char *dname;
int floor;
float budget;
};
class C_EMP_CAR {
private:
float registrationNo;
char *decal_date;
};
class C_EMPLOYEE {
private;
char *ename;
C_DEPARTMENT *dept;
SET<C_EMP_CAR>cars;
char *project;
};
class C_HOURLY_EMP; public C_EMPLOYEE {
private:
float wage;
char *skills;
};
```

Figure 5:
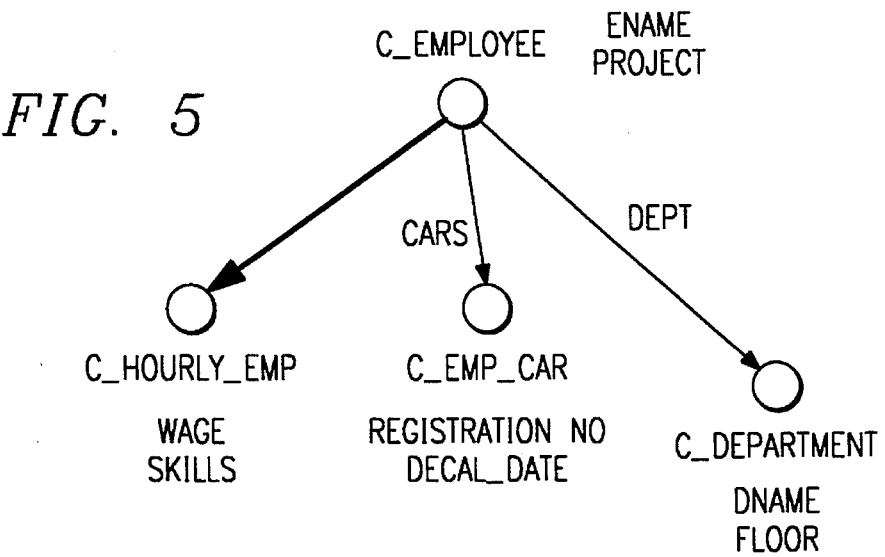
FIG. 5. An object-oriented Schema as a Graph.

An equivalent schema represented graphically is shown in FIG. 5, where small circles denote classes, and thick and thin links denote type-subtype and data member (attribute) relationships, respectively. The following is a procedure that consists of seven steps to map relations and connection types to C++ constructs.

Step one is create a class corresponding to each relation. For simplicity, we use relation names preceded by the string "C" to denote class names. Accordingly, the classes corresponding to the above relational schema are C_DEPARTMENT C_EMPLOYEE, C_HOURLY_EMP, and C_EMP_CAR (FIG. 5).

Step two is each non-foreign key attribute of a relation becomes an attribute of the corresponding class (e.g., dname, floor, and budget attributes of DEPARTMENT become attributes of C_DEPARTMENT). In C++, attributes are referred to as data members. The data types of the data members defined in this step are selected from the built-in C++ types (int, char, float, etc.). If the type of a data member is one of the C++ built-in types, it must be as close as possible to the data type of the corresponding relational attribute. Since, normally, the set of types in a relational DBMS does not exactly match the set of C++ built-in types, type conversion needs to be performed when objects are retrieved. (In case of Oracle, this type conversion is performed by the Oracle C Precompiler.)

Step three is we use the terms referencing and referenced class to denote classes corresponding to a referencing and referenced relations, respectively. There is a reference connection from relation EMPLOYEE to relation DEPARTMENT, therefore C_EMPLOYEE is a referencing class and C_DEPARTMENT is a referenced class. In this step of the procedure, a data member is created in every referencing class. The type of this data member is a pointer to the referenced class. Hence, in FIG. 5, the data member dept of C_EMPLOYEE is defined as a pointer to C_DEPARTMENT.

Step four is we use the terms owner and owned class to refer to classes corresponding to an owner and owned relations, respectively. Therefore, C_EMPLOYEE is an owner class and C_EMP_CAR is an owned class. In this step, a data member is created for every owner class. The type of this data member is "SET of" the owned class. Hence, the data member cars of C_EMPLOYEE is defined as SET of C_EMP_CAR.

Step five is a subset connection between two relations maps to a type subtype relationship between the classes corresponding to the two relations. Therefore C_HOURLY_EMP is defined in FIG. 5 as a subtype of C_EMPLOYEE.

Step six is for any two classes corresponding to two relations connected by a set-equality connection, a new class is created to act as a super class of these two classes. The data members common to the two classes are moved up to the super class.

Step seven is any two classes corresponding to two relations connected by a set-intersection connection are handled in the same way as step six above.

Another possible mapping for step six above is to merge the two classes into one class whose set of attributes is the union of the two sets of attributes of the two classes. For example, C_EMPLOYEE and C_EMP_INSU classes can be merged to form one class whose data members are ename, dept, project, policy, and date. However, we keep the schema described in step six as the default option and provide the DBA with the capability of interacting with the SGM module (FIG. 4) to specify other mapping options. The advantage of this is that step seven and the default option in 6 can be treated uniformly, which simplifies the initial prototype implementation. (Note that merging the two classes in step seven will result in loosing some semantic information about objects.)

In addition, a database designer input is necessary during the mapping process for the following reasons.

The first reason is to chose the names of classes and data members in the C++ schema. By default, data member names are the same as the attribute names, and class names are the same as the relations names preceded by the string "C_". A user (or a DBA) may prefer to chose different names. In this case, a name manager (part of O-R Gateway) needs to store the mappings between the C++ schema names and the underlying relational schema names. Query processing makes use of these name mappings.

The second reason is to add the definition of necessary public member functions to the generated C++ schema. These functions define the behavior of the C++ objects.

The third reason is to provide any information that is missing from the underlying relational DBMS (not all DBMSs support all functionalities) such as foreign-key relationships. The mapping rules and the DBA guidelines and choices will be recorded in the system since they will also guide the operation of the QTM and OGM modules (see FIG. 4).

Note: NON-NULL and primary key constraints are supported by almost all commercial relational database systems. Foreign key constraints are supported by DB2, SYBASE 4.0, and INGRES 6.3. Oracle provides syntax for defining foreign key constraints and stores the definitions in its dictionary but does not enforce them (as of Oracle Version 6.0).

Since the problem being considered is sizable, we only focus in this report on retrieval operations (queries). Further work is needed to support transactions that include update operations.

One of the key features of object queries as supported by many existing object query languages is the use of path expressions. If Class1 has a data member whose type is Class2 and Class2 has a data member whose type is Class3 in some schema, then "Class1.Class2.Class3" is a path expression that starts at Class1 and ends at Class3. Path expressions enable logical navigation at the schema level and can be used in specifying predicates or identifying the list of attributes to be retrieved. For example, "Class1.Class2.Class3=value" is an associative predicate that identifies all the Class1 objects whose related Class3 objects are equal to the given value. Different query languages may use different syntax to express path expressions. For example, the above path expression is expressed in functional query languages as "Class3(Class2(Class1))." Supporting path expressions in an object query language does not violate the principle of physical data independence since the query optimizer may independently choose the appropriate access paths at the physical level in order to evaluate a given query. Path expressions are used for querying complex objects by specifying predicates on data members that are deeply nested within the structure of these objects.

In O-R Gateway, we support the use of object queries in C++ programs that have the following structure:

| SELECT | <class-name> or |
| --- | --- |
|  | <path expressions rooted at a single class> |
| FROM | <range variable declarations> |
| WHERE | <predicates that may involve path expressions>. |

Where the FROM clause is optional. This syntax is similar to that of OQL[C++] developed at Texas Instruments (J. Blakeley, C. Thompson, and A. Alashqur, "Strawman Reference Model for Object Query Languages," Proceedings of the X3/SPARC/DBSSG OODB Task Group Workshop on Standardization of Object-Oriented Database Systems, Atlantic City, N.J., May 22, 1990. A revised version is also in the Proceedings of the International Journal on Computer Standards and Interfaces, 1991) for the Zeitgeist Object-Oriented Database System (Steve Ford, et al., "Zeitgeist: Database Support for Object-Oriented Programming," in the Proc. of the 2nd Int'l. Workshop on Object-Oriented Database Systems, 1988.). This syntax is upward compatible with that of the relational language SQL.

To translate an object query to an SQL query, we need to translate path expressions and expressions involving inheritance relationships to equivalent SQL joins. These joins are over matching key and foreign key attribute values of the relations corresponding to the classes referenced in the object query. A From clause in the SQL query will list the referenced relations. The Query Translation Mule performs such translations. For illustration, the following are four example object queries and their equivalent SQL queries. The first two of these queries contain path expressions, the third query is to demonstrate how a FROM clause in an object query can be useful, and the fourth query is to demonstrate how inheritance is handled. (Example queries in this section are expressed against the relational schema and its equivalent C++ schema described in a proceeding section.) Query 1:

```
SELECT C_EMPLOYEE.ename, C_EMPLOYEE.project
    WHERE C_EMPLOYEE.dept->floor = 2;
QTM translates this query to the following SQL query:
    SELECT EMPLOYEE.ename, EMPLOYEE.project
    FROM EMPLOYEE, DEPARTMENT
    WHERE EMPLOYEE.dept = DEPARTMENT.dname AND
        DEPARTMENT.floor = 2;
```

The path expression "C_EMPLOYEE.dept" in the WHERE clause of the object query is translated to the SQL join predicate "EMPLOYEE.dept=DEPARTMENT.dname". Syntactic simplification can be made in both object and SQL versions of a query by removing redundant information. For example, the attributes need not be qualified by their relation names in the SELECT clause of the above SQL query, therefore, reducing it to "SELECT ename, project". This is because each of ename and project is an attribute of exactly one of the relations referenced in the FROM clause. However, in this report, we use full syntax for the sake of clarity. Query 2 below includes a path expression in the SELECT clause. Query 2:

```
SELECT C_EMPLOYEE.ename,
    C_EMPLOYEE.dept->budget
    WHERE C_EMPLOYEE.project = 'OODB';
Translates to the following SQL query:
    SELECT EMPLOYEE.ename, DEPARTMENT.budget
    FROM EMPLOYEE, DEPARTMENT
    WHERE EMPLOYEE.dept = DEPARTMENT.dname AND
        EMPLOYEE.project = 'OODB'
```

The following object query demonstrates one of the ways in which the optional FROM clause can be used (note that the FROM clause is not optional in SQL). Query 3:

```
SELECT E1.ename, E2.ename
    FROM C_EMPLOYEE, E1, E2
    WHERE E1.project = E2.project
```

This query selects pairs of employee names for employees co-working on the same project. E1 and E2 are two range variables whose type is C_EMPLOYEE. This query is translated to the following SQL query:

```
SELECT E1.ename, E2.ename
    FROM EMPLOYEE.E1, EMPLOYEE.E2
    WHERE E1.project = E2.project
```

Since a subclass inherits the members of its superclass, an object query can reference the inherited data members directly. The following is an example query that involves inheritance. Query 4:

```
SELECT C_HOURLY_EMP.project, C_HOURLY_EMP.wage
    WHERE C_HOURLY_EMP.wage > 10k
```

C_HOURLY_EMP inherits project form C_EMPLOYEE, therefore project is referenced in the SELECT clause as an ordinary data member of C_HOURLY_EMP. The following SQL query accounts for this by performing an equijoin between the relations EMPLOYEE and HOURLY_EMP over ename values.

```
SELECT EMPLOYEE.project, HOURLY_EMP.wage
    WHERE EMPLOYEE.ename = HOURLY_EMP.ename AND
        HOURLY_EMP.wage > 10k
```

QTM will use the schema translation rules and DBA guidelines that are used by the Schema Generation Module (SGM) in the process of translating an object query to SQL. QTM will, based on these transformation rules, identify project as an attribute of EMPLOYEE and not of HOURLY_EMP relation even though it is referenced as a data member of the C_HOURLY_EMP class in the object query. QTM will also, based on these transformation rules, identify ename as the attribute that links the two relations EMPLOYEE and DEPARTMENT, and therefore it generates the predicate "EMPLOYEE.ename-HOURLY_EMP.ename" as part of the WHERE clause of the SQL query.

If an object query is included in an OQL/C++ program that is processed by O-R Gateway, the translated SQL query will appear in the generated SQL/C++ program preceded by the necessary host variable declarations and Oracle connect statements, and will be followed by code that constructs C++ objects out of the retrieved relational data. This is performed by the OGM, which generates the code that assembles data retrieved from the relational database to construct complex C++ objects.

An OQL/C++ application programmer needs to declare an aggregate object type such as an array or a set (or a pointer to an aggregate object) to hold the result of an object query. The data type of the elements of the aggregate object is either the class whose objects are to be retrieved or a pointer to it. Therefore, Query 1 above would be actually written in an OQL/C++ application program as follows (Note: the following syntax may not be very accurate, its goal is to convey the general meaning only):

```
/* EMPAR is declared as a pointer to an array of pointers to C_EMPLOYEE
objects */
    C_EMPLOYEE** EMPAR new C_EMPLOYEES*[100];
    EMPAR =
        SELECT C_EMPLOYEE.ename, C_EMPLOYEE.project
        WHERE C_EMPLOYEE.dept->floor = 2;
```

This query will assign pointers to the first 100 C_EMPLOYEE objects retrieved to the cells of the array EMPAR.

Using C++ Template Class definition capability [C++ Version 3.0 (Stanley Lippman, C++ Primer, Addison-Wesley Publishing Company, 1991)], one can declare a set whose type is pointer to C_EMPLOYEE objects as follows:

```
/* SET is declared somewhere else in the program as a Template Class */
    SET <C_EMPLOYEE*>*EMPSET = new SET <C_EMPLOYEE*>;
```

EMPSET can then be used to hold pointers to the employee objects returned by the query. The Object Generation Module (OGM) will add the necessary code that creates the C++ objects, assigns attribute values retrieved from the database to data members of objects, and adds the necessary CONNECT statements to connect to Oracle. The C++ code generated by the QTM and OGM to implement the above query and assign the result to the array EMPAR is as follows:

```
EXEC SQL BEGIN DECLARE SECTION;
    VARCHAR uid[20];
    VARCHAR pwd[20];
    VARCHAR ename_var[15];
    VARCHAR project_var[15];
    int floor;
EXEC SQL END DECLARE SECTION;
EXEC SQL INCLUDE sqlca.h;
EXEC SQL INCLLTDE oraca.h;
strcpy(uid.arr,"USERNAME");
uid.len = strlen(uid.arr);
strcpy(pwd.arr,"PASSWORD");
pwd.len = strlen(pwd.arr);
EXEC SQL CONNECT :uid IDENTIFIED BY :pwd;
EXEC SQL DECLARE emp_objects CURSOR FOR
SELECT EMPLOYEE.ename,EMPLOYEE.project
FROM EMPLOYEE,DEPARTMENT
WHERE EMPLOYEE.dept = DEPARTMENT.dname AND
    DEPARTMENT.floor = 2;
EXEC SQL OPEN emp_object;
EXEC SQL WHENEVER NOT FOUND GOTO end_of_fetch;
/* retrieve data for the first 100 employee objects */
for (int = 0; i < 100; ++i) {
    EXEC SQL FETCH emp_object INTO :ename_var; :project_var;
    ename_var.arr[ename_var.len] = '/0';
    project_var.arr[project_var.len] = '/0';
    /* create the i'th employee objects */
    EMPAR[i] = new C_EMPLOYEE;
    /* assign attribute values to corresponding object data members
    */
    EMPAR[i]->ename = ename_var;
    EMPAR[i]->project = project_var;
}/* end of for */
end_of_fetch:
EXEC SQL CLOSE emp_object;
EXEC SQL COMMIT WORK RELEASE;
/* log off the Oracle database. */
```

In Query 2, several C_EMPLOYEE objects may share the same C_DEPARTMENT object. In this case, we need to install a C_DEPARTMENT object only once in main memory and make all related C_EMPLOYEE objects point to it.

This is done in O-R Gateway by maintaining an association table(s) that stores the relationship between a pointer to the object as represented in main memory and the key attribute value of the corresponding tuple as stored in the relational database. The association table is maintained as a C++ data structure and has the following format: the C++Pointer field stores a pointer to an object that has been installed in memory. Rel-Key-Attr-Value stores the key attribute value of the relational tuple that corresponds to the C++ object. Counter stores the number of other C++ objects in main memory that share (point to) this object. This information may be useful for garbage collection and for supporting update operations.

In order to maintain this table, the generated SQL query needs to retrieve the key attribute value even if it is not referenced in the object query. The following shows Query 2 again, and the SQL query that is actually generated by the QTM.

```
SELECT C_EMPLOYEE.ename,
C_EMPLOYEE.dept->budget
WHERE C_EMPLOYEE.project = 'OODB';
```

The generated SQL query:

```
SELECT EMPLOYEE.ename, DEPARTMENT.budget,
DEPARTMENT.dname
   FROM EMPLOYEE, DEPARTMENT
   WHERE EMPLOYEE.dept = DEPARTMENT.dname AND
```

-continued

EMPLOYEE.project = 'OODB'

Whenever a new <ename, budget, dname> tuple is fetched, O-R Gateway assigns ename to a data member of a newly created C_EMPLOYEE object. O-R Gateway then looks up the Rel-Key-Attr-Value column of the association table for a dname entry which has the same value as the one just retrieved. If a dname value exists, this means that the needed C_DEPARTMENT object has already been installed in memory. In this case, a pointer from the newly created C_EMPLOYEE object to this C_DEPARTMENT object will be established by using the C++Pointer field of the association table, the budget data member is assigned the retrieved value, and the Counter field is incremented by one. If on the other hand, there is no dname entry in the Rel-Key-Attr-Value that has the same value, then a new C_DEPARTMENT object is created, its budget data member is assigned the value retrieved by the SQL query, the C_EMPLOYEE object is made to point to it, and a new tuple is inserted in the association table to related a pointer to this C_DEPARTMENT object to the dname key attribute value. The OGM generates code that performs the above functions and maintains the association table up-to-date.

The association table idea can be used to enable more than one query in the same OQL/C++ application program to retrieve information about objects of the same class. For example, both Query 1 and Query 2 above retrieve information about objects of the class C_EMPLOYEE. These two queries can be used in the same OQL/C++ application program. In this case, an association table will relate pointers to C_EMPLOYEE objects retrieved by the first query to their key attribute values. When the second query is executed, the association table is checked for every <ename, budget> tuple retrieved by the SQL query to see if a C_EMPLOYEE object corresponding to the ename value has already been installed in memory by the first object query. If so, the C_EMPLOYEE.dept->budget data member of this object will be assigned the value retrieved by the second query. Otherwise, a new C_EMPLOYEE object is installed and the association table is updated to reflect the new situation.

An object faulting mechanism can be implemented as part of O-R Gateway. Whenever a pointer to an object that is not in the C++ environment (as indicated by the association table) is traversed in the C++ program, a query will be generated to retrieve the relevant relational data which will then be used to seamlessly install the referenced object in the C++ environment. The association table will be updated accordingly.

Although the present invention and its advantages have been described in detail by way of the preferred embodiment, it is to be understood that this is for example only and that various changes, substitutions and alterations can be made without departing from the spirit and scope of the invention as defined by the appended claims.

What is claimed is:

1. A method of extending the capability of a database management system's precompiler to object-oriented languages comprising:
   embedding SQL statements in an object-oriented program;
   compiling said object-oriented program with a precompiler from said database management system into a temporary file; compiling said temporary file with an object-oriented precompiler into a file acceptable to an object-oriented compiler; and compiling said file with said object-oriented compiler into an executable file.

2. The method of claim 1, wherein said object-oriented program utilizes C++.

3. The method of claim 1, wherein said database management system is a relational database management system.

4. The method of claim 1, wherein said database management system utilizes Oracle.

5. A method of enabling object queries in an object-oriented program using a database management system which is not object-oriented comprising:
   creating a program with object query language statements and object-oriented language statements;
   converting said object query language statements of the program into structured query language statements to generated a converted object-oriented program;
   compiling said converted object-oriented program with a precompiler from said database management system into a temporary file;
   compiling said temporary file with an object-oriented precompiler into a file acceptable to an object-oriented compiler; and
   compiling said file with said object-oriented compiler into an executable file.

6. The method of claim 5, wherein said database management system is a relational database management system.

7. The method of claim 6, wherein said converting step includes converting an object-oriented schema into a relational schema for the conversion of the queries.

8. The method of claim 7, wherein said converting the object query language portion of the program further includes converting queries from an object-oriented database query to a relational database query.

9. The method of claim 7, wherein said converting of said object-oriented schema includes extracting relational schema information from a relational dictionary in the relational database system.

10. The method of claim 9, wherein said converting of said object-oriented schema further includes generating library files containing class definitions representing said relational schema.

11. The method of claim 10, wherein said converting of said object-oriented schema further includes creating and maintaining mapping rules for class definitions representing said relational schema.

12. The method of claim 7, wherein said converting queries includes parsing program to identify object-oriented database queries.

13. The method of claim 12, wherein said converting queries further includes translating said object-oriented queries into SQL queries utilizing said mapping rules.

14. A method of extending the capability of a relational database management system's precompiler to object-oriented languages comprising:
   embedding SQL statements in an object-oriented program;
   compiling said object-oriented program with a precompiler from said database management system into a temporary file;
   compiling said temporary file with an object-oriented precompiler into a file acceptable to a object-oriented compiler; and
   compiling said file with said object-oriented compiler into an executable file;
   wherein said object-oriented program utilizes C++; and
   wherein said database management system utilizes Oracle.

* * * * *